(12) United States Patent
Tsubouchi

(10) Patent No.: US 11,329,298 B2
(45) Date of Patent: May 10, 2022

(54) EXPANDER AND FUEL CELL SYSTEM

(71) Applicant: TOYOTA JIDOSHA KABUSHIKI KAISHA, Aichi-ken (JP)

(72) Inventor: Masakatsu Tsubouchi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 157 days.

(21) Appl. No.: 16/900,999

(22) Filed: Jun. 15, 2020

(65) Prior Publication Data
US 2021/0036345 A1    Feb. 4, 2021

(30) Foreign Application Priority Data

Jul. 29, 2019    (JP) .............................. JP2019-139056

(51) Int. Cl.
| | | |
|---|---|---|
| *H01M 8/04* | (2016.01) | |
| *H01M 8/04089* | (2016.01) | |
| *H01M 8/04007* | (2016.01) | |
| *H01M 8/04746* | (2016.01) | |
| *H01M 8/0432* | (2016.01) | |
| *B60L 58/30* | (2019.01) | |
| *H01M 8/04082* | (2016.01) | |

(52) U.S. Cl.
CPC ......... *H01M 8/04089* (2013.01); *B60L 58/30* (2019.02); *H01M 8/04074* (2013.01); *H01M 8/04201* (2013.01); *H01M 8/04358* (2013.01); *H01M 8/04753* (2013.01); *H01M 2250/20* (2013.01)

(58) Field of Classification Search
CPC ......... H01M 8/04074; H01M 8/04089; H01M 8/04201; H01M 8/04358; H01M 8/04753
USPC .......................................................... 429/444
See application file for complete search history.

(56) References Cited

U.S. PATENT DOCUMENTS

| | | |
|---|---|---|
| 2019/0036139 A1 | 1/2019 | Tsubouchi et al. |
| 2019/0211820 A1* | 7/2019 | Bush .................. F04C 2/02 |
| 2019/0211824 A1* | 7/2019 | Shaffer .............. F04C 25/02 |

FOREIGN PATENT DOCUMENTS

| | | | |
|---|---|---|---|
| JP | 2003217641 A | 7/2003 | |
| JP | 200673404 A | 3/2006 | |
| JP | 201929100 A | 2/2019 | |
| WO | WO-2014103413 A1 * | 7/2014 | ............ F01C 1/0215 |

* cited by examiner

Primary Examiner — James M Erwin

(74) Attorney, Agent, or Firm — Hauptman Ham, LLP

(57) ABSTRACT

Provided is an expander including: an expanding chamber that expands a working fluid introduced and discharges the expanded working fluid; a driving chamber housing a driving mechanism that is driven by expansion energy of the working fluid; an intermediate chamber interposed between the expanding chamber and the driving chamber ; a first seal member that seals a gap between the expanding chamber and the intermediate chamber ; a second seal member that seals a gap between the driving chamber and the intermediate chamber ; and a pressurizing unit that pressurizes a pressurized fluid filling the intermediate chamber.

12 Claims, 7 Drawing Sheets

EXPANDER AND FUEL CELL SYSTEM

INCORPORATION BY REFERENCE

The disclosure of Japanese Patent Application No. 2019-139056 filed on Jul. 29, 2019 including the specification, drawings and abstract is incorporated herein by reference in its entirety.

BACKGROUND

1. Technical Field

The present disclosure relates to an expander and a fuel cell system including the expander.

2. Description of Related Art

In the fuel cell system described in Japanese Patent Application Publication No. 2003-217641, an expander that depressurizes and expands hydrogen is disposed on the route of a passage through which hydrogen is supplied from a high-pressure hydrogen tank to a fuel cell. The expansion energy of hydrogen expanding in the expander is converted into mechanical energy, which is used to drive a blower to rotate. This blower blows air toward a condensing recovery unit that condenses steam contained in unreacted air exhausted from the fuel cell.

SUMMARY

An expander such as the one mentioned above has, for example, an expanding chamber that adiabatically expands hydrogen, and a driving chamber housing a driving mechanism that is driven by the expansion energy of hydrogen. A gap between the expanding chamber and the driving chamber is sealed by a seal member. During operation of the expander, a difference occurs between the internal pressure of the expanding chamber and the internal pressure of the driving chamber, and this differential pressure acts on the seal member. As a result, hydrogen may leak from the expanding chamber to the driving chamber, or lubricating oil may leak from the driving chamber to the expanding chamber.

In view of this fact, the present disclosure aims to provide an expander that can effectively reduce the likelihood of fluid leakage between the expanding chamber and the driving chamber, and a fuel cell system including this expander.

An expander according to the disclosure described in claim 1 includes: an expanding chamber that expands a working fluid introduced and discharges the expanded working fluid; a driving chamber housing a driving mechanism that is driven by expansion energy of the working fluid; an intermediate chamber interposed between the expanding chamber and the driving chamber; a first seal member that seals a gap between the expanding chamber and the intermediate chamber; a second seal member that seals a gap between the driving chamber and the intermediate chamber; and a pressurizing unit that pressurizes a pressurized fluid filling the intermediate chamber.

In the expander described in claim 1, the working fluid introduced into the expanding chamber is expanded and then discharged from the expanding chamber. The expansion energy of the working fluid drives the driving mechanism housed in the driving chamber. The intermediate chamber is interposed between the expanding chamber and the driving chamber. The gap between the intermediate chamber and the expanding chamber is sealed by the first seal member, and the gap between the intermediate chamber and the driving chamber is sealed by the second seal member. The pressurized fluid filling the intermediate chamber is pressurized by the pressurizing unit. Thus, the difference in the internal pressure between the expanding chamber and the intermediate chamber can be made smaller than that between the expanding chamber and the driving chamber, and the differential pressure acting on the first seal member can be reduced accordingly. As a result, the working fluid is less likely to leak from the expanding chamber to the intermediate chamber. Moreover, as the internal pressure of the intermediate chamber becomes higher than the internal pressure of the driving chamber, a fluid (e.g., lubricating oil for the driving mechanism) is less likely to leak from the driving chamber to the intermediate chamber. Thus, the likelihood of fluid leakage between the expanding chamber and the driving chamber can be effectively reduced.

An expander according to the disclosure described in claim 2 is the expander of claim 1, wherein the pressurizing unit has: a pressurizing device that pressurizes the pressurized fluid; a first pressure sensor that detects the pressure of the pressurized fluid; a second pressure sensor that detects the pressure of the working fluid discharged from the expanding chamber; and a control unit that controls the pressurizing device based on detection results of the first pressure sensor and the second pressure sensor.

In the expander described in claim 2, the pressure of the pressurized fluid filling the intermediate chamber is detected by the first pressure sensor, and the pressure of the working fluid discharged from the expanding chamber is detected by the second pressure sensor. The control unit controls the pressurizing device (e.g., a cylinder device or a pump) based on detection results of these pressure sensors, and the pressurizing device pressurizes the pressurized fluid. Thus, feedback control can be performed on the pressure of the pressurized fluid according to the pressure of the working fluid discharged from the expanding chamber.

An expander according to the disclosure described in claim 3 is the expander of claim 1, wherein the pressurizing unit pressurizes the pressurized fluid using the pressure of the working fluid discharged from the expanding chamber.

In the expander described in claim 3, the pressurized fluid introduced into the intermediate chamber is pressurized using the pressure of the working fluid discharged from the expanding chamber. Thus, the configuration of the pressurizing unit can be simplified, as there is no need for a pressurizing device dedicated to pressurizing the pressurized fluid and a configuration for controlling this pressurizing device.

An expander according to the disclosure described in claim 4 is the expander of claim 3, wherein the pressurizing unit includes a tank having: a first chamber which communicates with the expanding chamber and into which the working fluid discharged from the expanding chamber is introduced; a second chamber which communicates with the intermediate chamber and is filled with the pressurized fluid; and a pressure transmitting part that separates the first chamber and the second chamber from each other and transmits the internal pressure of the first chamber to the second chamber.

In the expander described in claim 4, the first chamber of the tank communicates with the expanding chamber and the second chamber of the tank communicates with the intermediate chamber. The working fluid discharged from the expanding chamber is introduced into the first chamber, and the second chamber is filled with the pressurized fluid. The internal pressure of the first chamber is transmitted to the second chamber by the pressure transmitting part. Thus, the pressurized fluid filling the second chamber communicating with the intermediate chamber can be pressurized using the pressure of the working fluid introduced into the first chamber.

An expander according to the disclosure described in claim 5 is the expander of claim 4, wherein the tank has a filling port through which the second chamber is filled with the pressurized fluid.

In the expander described in claim 5, the second chamber can be filled with the pressurized fluid through the filling port of the tank. Thus, the pressurized fluid can be replenished when, for example, the pressurized fluid has leaked from the intermediate chamber etc.

An expander according to the disclosure described in claim 6 is the expander of any one of claims 1 to 5, including a housing having the expanding chamber, the driving chamber, and the intermediate chamber formed inside, and a scroll mechanism which is provided inside the expanding chamber and in which the working fluid expands between a fixed scroll and a movable scroll and the movable scroll performs revolving turning movements relatively to the fixed scroll. The intermediate chamber is formed by an annular groove that is formed in the housing so as to face the movable scroll. The first seal member and the second seal member are provided one on each side of the annular groove in a radial direction between the housing and the movable scroll.

In the expander described in claim 6, the expanding chamber, the driving chamber, and the intermediate chamber are formed inside the housing. The scroll mechanism is provided inside the expanding chamber. In the scroll mechanism, the working fluid expands between the fixed scroll and the movable scroll, and the movable scroll performs revolving turning movements relatively to the fixed scroll. The annular groove forming the intermediate chamber is formed in the housing so as to face the movable scroll, and the first seal member and the second seal member are provided one on each side of the annular groove in the radial direction between the housing and the movable scroll. The gap between the expanding chamber and the intermediate chamber, and the gap between the driving chamber and the intermediate chamber are sealed by these seal members, and the pressurized fluid filling the intermediate chamber is pressurized by the pressurizing unit. Thus, the likelihood of fluid leakage inside the housing of the scroll expander can be effectively reduced by a simple configuration.

An expander according to the disclosure described in claim 7 is the expander of any one of claims 1 to 6, wherein the working fluid and the pressurized fluid are fluids of different types.

In the expander described in claim 7, the working fluid and the pressurized fluid are fluids of different types. Thus, even when, for example, a fluid that is troublesome to safely manage is used as the working fluid, a fluid that is easy to safely manage can be used as the pressurized fluid.

An expander according to the disclosure described in claim 8 is the expander of claim 7, wherein the working fluid is hydrogen and the pressurized fluid is nitrogen, helium, water, or a coolant.

In the expander described in claim 8, hydrogen that is troublesome to safely manage is used as the working fluid, while a safe fluid such as nitrogen, helium, water, or a coolant is used as the pressurized fluid. When the pressurized fluid is a gas, such as nitrogen or helium, weight reduction can be achieved compared with when the pressurized fluid is a liquid. When the pressurized fluid is a liquid, such as water or a coolant, an abnormality, for example, leakage is easy to detect compared with when the pressurized fluid is a gas.

A fuel cell system according to the disclosure described in claim 9 includes: a hydrogen tank holding hydrogen that is the working fluid; a fuel cell that generates electricity through an electrochemical reaction between the hydrogen and oxygen in the air; a hydrogen supply passage through which the hydrogen is supplied from the hydrogen tank to the fuel cell; and the expander according to any one of claims 1 to 8 which is connected to some point in the hydrogen supply passage and in which the hydrogen supplied from the hydrogen tank to the fuel cell is introduced into and expanded in the expanding chamber and then discharged from the expanding chamber.

In the fuel cell system described in claim 9, the hydrogen held in the hydrogen tank is supplied to the fuel cell through the hydrogen supply passage. The fuel cell generates electricity by causing an electrochemical reaction between the hydrogen supplied thereto and oxygen in the air. The expander is connected to some point in the hydrogen supply passage. In the expander, the hydrogen is introduced into and expanded in the expanding chamber and then discharged from the expanding chamber. The expansion energy of the hydrogen drives the driving mechanism housed in the driving chamber. Thus, the expansion energy of the hydrogen can be converted into mechanical energy. Moreover, this expander is the expander described in any one of claims 1 to 8, and therefore has the above-described workings and effects.

A fuel cell system according to the disclosure described in claim 10 is the fuel cell system of claim 9, including a radiator that cools a cooling medium of the fuel cell, and a fan that is driven by driving force of the driving mechanism and blows air toward the radiator.

In the fuel cell system described in claim 10, the fan is driven by the driving force of the driving mechanism of the expander. The fan blows air toward the radiator that cools the cooling medium of the fuel cell. Thus, the cooling performance of the radiator can be enhanced.

A fuel cell system according to the disclosure described in claim 11 is the fuel cell system of claim 9 or 10 citing claim 4 or 5, wherein the tank is connected to the hydrogen supply passage, between the expander and the fuel cell, such that the hydrogen discharged from the expander passes through the first chamber.

In the fuel cell system described in claim 11, the expander is connected to some point in the hydrogen supply passage through which hydrogen is supplied from the hydrogen tank to the fuel cell, and the tank is connected to the hydrogen supply passage, between the expander and the fuel cell. The hydrogen discharged from the expander passes through the first chamber of the tank. The internal pressure of the first chamber is transmitted to the second chamber by the pressure transmitting part and pressurizes the pressurized fluid filling the second chamber. Thus, the pressurized fluid is efficiently pressurized using the pressure of the hydrogen discharged from the expander and supplied to the fuel cell.

As has been described above, the expander and the fuel cell system according to the present disclosure can effectively reduce the likelihood of fluid leakage between the expanding chamber and the driving chamber.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

An expander 10 and a fuel cell system 100 according to a first embodiment of the present disclosure will be described below using FIG. 1 to FIG. 5. The fuel cell system 100 according to this embodiment is installed, for example, in a vehicle (a fuel cell electric vehicle; not shown).

Configuration

Figure 1:
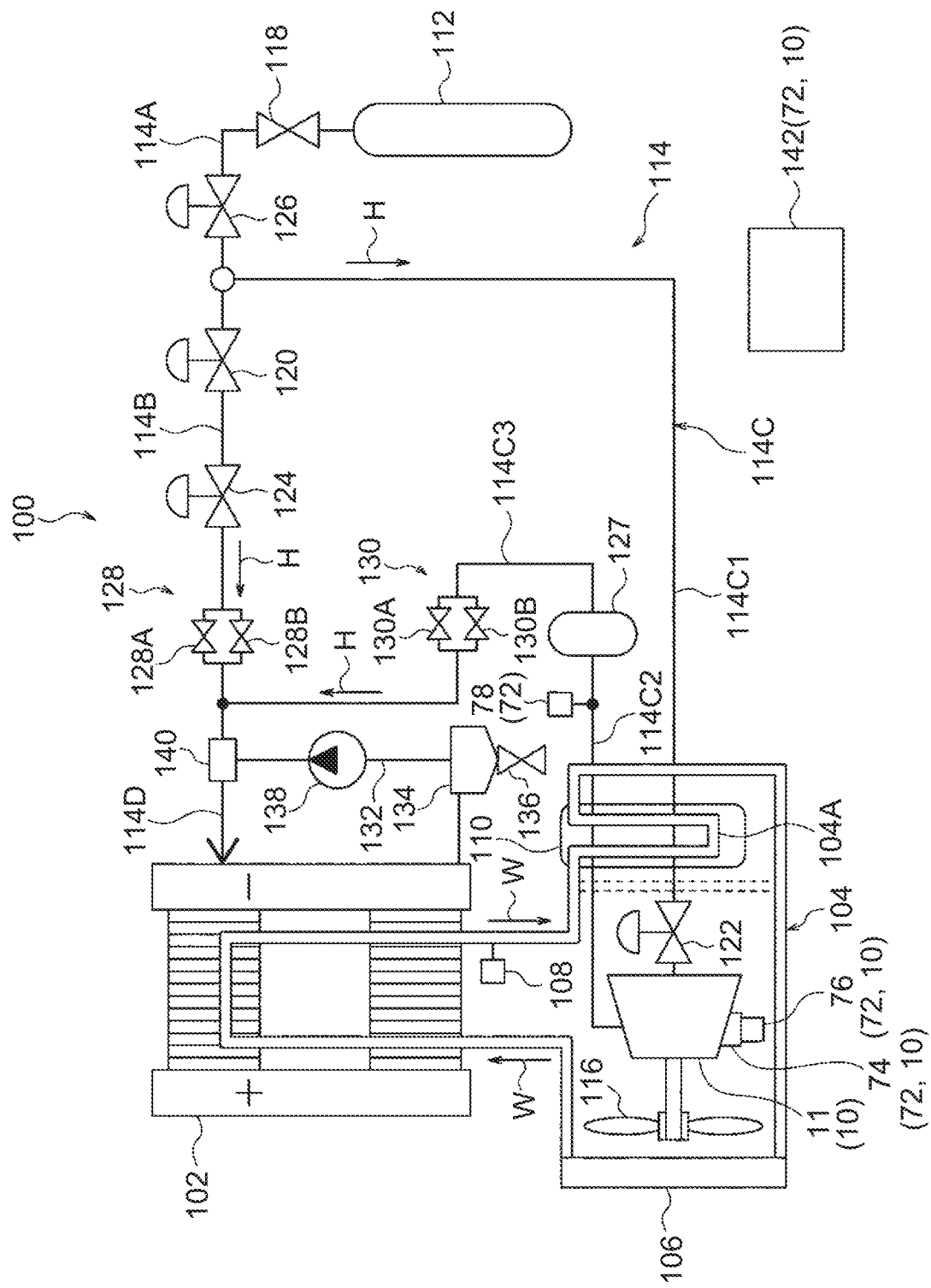
FIG. 1 is a configuration diagram showing an example of the schematic configuration of a fuel cell system according to a first embodiment of the present disclosure.

As shown in FIG. 1, the fuel cell system 100 according to this embodiment includes, for example, a fuel cell stack 102, a cooling passage 104, a radiator 106, a temperature sensor 108, a heat exchanger 110, a hydrogen tank 112, a hydrogen supply passage 114, the expander 10, a fan 116, a main valve 118, a first on-off valve 120, a second on-off valve 122, a first pressure regulating valve 124, a second pressure regulating valve 126, a sub-tank 127, a first injector 128, a second injector 130, a return flow passage 132, a gas-liquid separator 134, a drain valve 136, a pump 138, a three-way branching part 140, and a control unit 142. The expander 10 is composed of a hydrogen expander 11 constituting the main body of the expander 10 and a pressurizing unit (pressure introducing unit) 72.

The overall configuration of the fuel cell system 100 will be described first and then the configuration of the expander 10 that is the main part of this embodiment will be described. In FIG. 1, arrow H indicates a flow direction of hydrogen (hydrogen gas), and arrow W indicates a flow direction of a coolant that is a cooling medium of the fuel cell stack 102. In the following description, the side of the hydrogen supply passage 114 closer to the hydrogen tank 112 will be referred to as an upstream side in the flow of hydrogen and the side thereof closer to the fuel cell stack 102 will be referred to as a downstream side in the flow of hydrogen.

Overall Configuration of Fuel Cell System

The fuel cell stack 102 is an example of the fuel cell. Specifically, the fuel cell stack 102 is a unit that generates electricity through an electrochemical reaction between hydrogen and oxygen, and is formed by a stack of a plurality of single cells. The fuel cell stack 102 is supplied with oxygen in compressed air from an air supply unit (not shown). Further, the fuel cell stack 102 is supplied with hydrogen from the hydrogen tank 112 through the hydrogen supply passage 114.

The cooling passage 104 is formed by a pipe through which the coolant circulates from the radiator 106 through an inside of the fuel cell stack 102 and the heat exchanger 110 back to the radiator 106. The coolant is circulated through the cooling passage 104 by a pump (not shown). A portion of the cooling passage 104 that comes into contact with the heat exchanger 110 is, for example, a bent portion 104A that is bent into a U-shape. The cooling passage 104 has a larger area of contact with the heat exchanger 110 when the bent portion 104A is formed therein than when the bent portion 104A is not formed therein. The fuel cell stack 102 is cooled by the coolant flowing through the cooling passage 104.

The radiator 106 cools the coolant inside the cooling passage 104 using a wind that hits the vehicle (not shown) as it travels. The radiator 106 is cooled also by air blown from the fan 116 disposed facing the radiator 106. The temperature sensor 108 is provided in the cooling passage 104, near an outlet of the fuel cell stack 102, and detects the temperature of the coolant in the cooling passage 104.

The heat exchanger 110 is in contact with, for example, the bent portion 104A of the cooling passage 104. Further, the heat exchanger 110 is in contact with the hydrogen supply passage 114 on the downstream side of the hydrogen expander 11. The heat exchanger 110 is configured to allow heat exchange between hydrogen having been cooled by undergoing adiabatic expansion in the hydrogen expander 11 and the coolant circulating through the cooling passage 104.

Further, the heat exchanger 110 is in contact with the hydrogen supply passage 114, for example, on the upstream side of the hydrogen expander 11. This is to raise the temperature of the hydrogen in the hydrogen supply passage 114 using the heat of the high-temperature coolant flowing through the cooling passage 104 of the fuel cell stack 102 before adiabatically expanding the hydrogen in the hydrogen expander 11. Thus, the volume of the hydrogen is increased and a larger amount of driving force to be described later can be produced. Moreover, since hydrogen has a high temperature decreasing rate when expanded, the heat of the coolant is given to the hydrogen on the upstream side of the hydrogen expander 11 so as not to excessively cool the hydrogen in the hydrogen expander 11.

The hydrogen tank 112 that is a pressure-resistant container holds high-pressure (e.g., 70 MPa or higher) hydrogen (fuel hydrogen) to be supplied to the fuel cell stack 102. This hydrogen is used as a working fluid of the hydrogen expander 11. An upstream-side end of the hydrogen supply passage 114 is connected to the hydrogen tank 112.

The hydrogen supply passage 114 is a passage through which hydrogen is supplied from the hydrogen tank 112 to the fuel cell stack 102, and is formed by a pipe through which hydrogen flows. The hydrogen supply passage 114 connects the hydrogen tank 112 and the fuel cell stack 102 to each other. The hydrogen supply passage 114 is composed of an upstream-side passage 114A extending from the hydrogen tank 112, a main passage 114B and a bypass passage 114C into which a leading end of the upstream-side passage 114A branches and which merge together on the side of the fuel cell stack 102, and a downstream-side passage 114D that connects a junction of the main passage 114B and the bypass passage 114C and the fuel cell stack 102 to each other.

The upstream-side passage 114A is provided with the main valve 118 and the second pressure regulating valve 126. The main valve 118 is, for example, an electromagnetic gate valve and can open and close the upstream-side passage 114A. The second pressure regulating valve 126 is a control valve and disposed downstream of the main valve 118. The second pressure regulating valve 126 can regulate the pressure of hydrogen having passed through the main valve 118.

The main passage 114B is provided with the first on-off valve 120, the first pressure regulating valve 124, and the first injector 128. The first on-off valve 120 is a control valve and can open and close the main passage 114B. The first pressure regulating valve 124 is a control valve and disposed downstream of the first on-off valve 120. The first pressure regulating valve 124 can regulate the pressure of hydrogen having passed through the first on-off valve 120. The first injector 128 has two injectors 128A, 128B including, for example, an electromagnetic on-off valve, and the operating states of the injectors 128A, 128B are switched according to the amount of hydrogen supplied to the fuel cell stack 102.

The bypass passage 114C is provided with the second on-off valve 122, the hydrogen expander 11, the sub-tank 127, and the second injector 130. The second on-off valve 122 is a control valve and can open and close the bypass passage 114C. On the upstream side of the second on-off valve 122, part of the bypass passage 114C is in contact with the heat exchanger 110.

The hydrogen expander 11 is disposed near and downstream of the second on-off valve 122 and connected to some point in the bypass passage 114C (hydrogen supply passage 114). Hydrogen having undergone primary depressurization by the second pressure regulating valve 126 is introduced into the hydrogen expander 11. The hydrogen expander 11 is configured to adiabatically expand (depressurize and expand) the hydrogen introduced inside and thereby generate cold heat of the hydrogen and convert the expansion energy of the hydrogen into mechanical energy. The fan (blower) 116 as an energy recovery device is connected to the hydrogen expander 11. The fan 116 is disposed facing the radiator 106, and is driven to blow air toward the radiator 106 as the mechanical energy is transmitted thereto. The energy recovery device is not limited to the fan 116 but may instead be a power generator, a compressor, or the like.

The sub-tank 127 is disposed downstream of the hydrogen expander 11. The sub-tank 127 is, for example, an accumulator (pressure accumulator), and is connected to some point in the bypass passage 114C between the hydrogen expander 11 and the fuel cell stack 102 such that hydrogen discharged from the hydrogen expander 11 passes through an inside of the sub-tank 127. The internal pressure of the sub-tank 127 is higher than the atmospheric pressure. The sub-tank 127 functions as a pressure chamber that maintains a pressure applied to the second injector 130. The sub-tank 127 functions also to stabilize the operation of the second injector 130 to be described later by reducing pressure fluctuations of hydrogen discharged from the hydrogen expander 11. Part of the bypass passage 114C and the heat exchanger 110 are in contact with each other between the sub-tank 127 and the hydrogen expander 11.

In the following description, a part of the bypass passage 114C on the upstream side from the hydrogen expander 11, a part thereof between the hydrogen expander 11 and the sub-tank 127, and a part thereof on the downstream side from the sub-tank 127 may be referred to as "an upstream part 114C1," "an intermediate part 114C2," and "a downstream part 114C3," respectively.

The second injector 130 has two injectors 130A, 130B including, for example, an electromagnetic on-off valve, and the operating states of the injectors 130A, 130B are switched according to the amount of hydrogen supplied to the fuel cell stack 102. On the downstream side of the second injector 130, the bypass passage 114C merges with a joint of the main passage 114B and the downstream-side passage 114D.

The downstream-side passage 114D is provided with the three-way branching part 140. One end of the return flow passage 132 is connected to the three-way branching part 140. The other end of the return flow passage 132 is connected to the fuel cell stack 102. Exhaust air from the fuel cell stack 102 flows into the return flow passage 132. The return flow passage 132 is provided with the gas-liquid separator 134 and the pump 138, and the exhaust air flows into the gas-liquid separator 134. The gas-liquid separator 134 separates a hydrogen gas and a reactant gas contained in the exhaust air into a gas component and a liquid component. The drain valve 136 is connected to the gas-liquid separator 134, and the liquid component separated by the gas-liquid separator 134 is drained by the drain valve 136. The gas component separated by the gas-liquid separator 134 flows to the three-way branching part 140.

In the three-way branching part 140, the exhaust air and hydrogen that flows into the downstream-side passage 114D from at least one of the bypass passage 114C and the main passage 114B merge together. Thus, unreacted hydrogen contained in the exhaust air is supplied to the fuel cell stack 102 along with the hydrogen flowing into the downstream-side passage 114D from the at least one passage.

Figure 2:
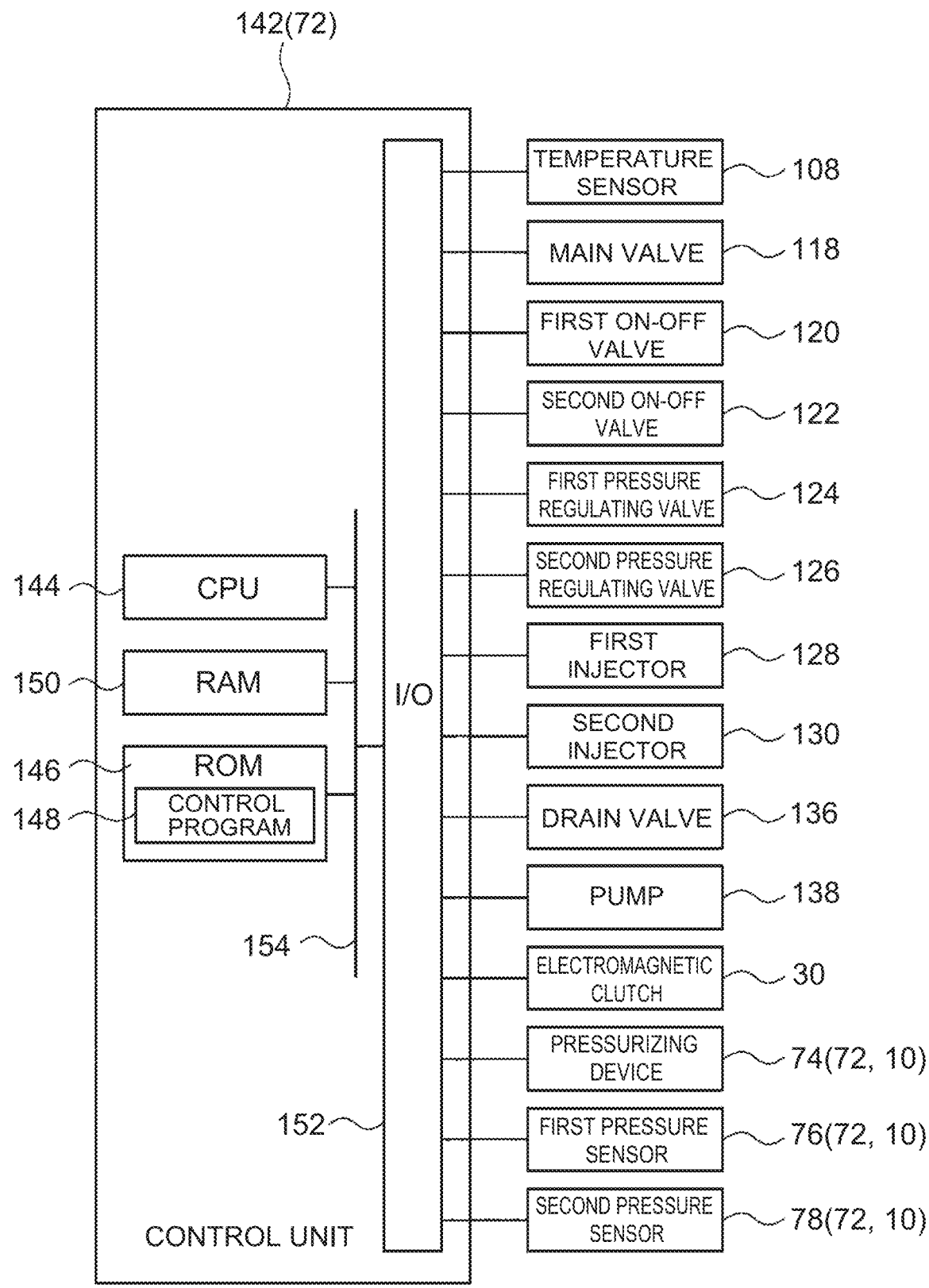
FIG. 2 is a block diagram showing a control system of the fuel cell system according to the first embodiment.

Meanwhile, as shown in FIG. 2, the control unit 142 has a central processing unit (CPU; processor) 144, a read-only memory (ROM) 146, a random-access memory (RAM) 150, and an input-output interface (I/O) 152 that communicates with external devices, and these components are connected to one another through a bus 154 so as to be able to communicate with one another.

The input-output interface 152 is electrically connected to the temperature sensor 108, main valve 118, first on-off valve 120, second on-off valve 122, first pressure regulating valve 124, second pressure regulating valve 126, first injector 128, second injector 130, pump 138, and drain valve 136. Further, the input-output interface 152 is electrically connected to an electromagnetic clutch 30, pressurizing device 74, first pressure sensor 76, and second pressure sensor 78 that will be described later. The CPU 144 is a central processing unit and executes various programs and controls relevant parts. Specifically, the CPU 144 reads out a control program 148 from the ROM 146 and executes the control program 148 using the RAM 150 as a work area. The CPU 144 is configured to control the aforementioned components and execute various arithmetic processes in accordance with the control program 148 stored in the ROM 146.

The control unit 142 thus configured controls the operations of the main valve 118, first on-off valve 120, second on-off valve 122, first pressure regulating valve 124, second pressure regulating valve 126, first injector 128, second injector 130, pump 138, drain valve 136, and electromagnetic clutch 30 based on an output from the temperature sensor 108.

For example, when the temperature of the coolant detected by the temperature sensor 108 is lower than a preset reference temperature, the control unit 142 activates the first injector 128 with the second on-off valve 122 closed and the first on-off valve 120 opened. Thus, the control unit 142 supplies hydrogen to the fuel cell stack 102 through the main passage 114B without activating the hydrogen expander 11 so as not to cool the hydrogen more than necessary. For example, when the temperature of the coolant detected by the temperature sensor 108 is equal to or higher than the reference temperature, the control unit 142 activates the second injector 130 with the first on-off valve 120 closed and the second on-off valve 122 opened. Thus, the control unit 142 supplies hydrogen to the fuel cell stack 102 through the bypass passage 114C by activating the hydrogen expander 11. As the hydrogen is adiabatically expanded in the hydrogen expander 11, cold heat of the hydrogen is generated and the expansion energy of the hydrogen is recovered as mechanical energy. Thus, the hydrogen expander 11 has high energy recovery efficiency when the temperature of the coolant is equal to or higher than the reference temperature.

Configuration of Expander

Next, the configuration of the expander 10 that is the main part of this embodiment will be described. As described above, the expander 10 according to this embodiment is composed of the hydrogen expander (expander main body) 11 constituting the main body of the expander 10 and the pressurizing unit 72. The pressurizing unit 72 includes the control unit 142, the pressurizing device 74, the first pressure sensor 76, and the second pressure sensor 78.

Figure 3:
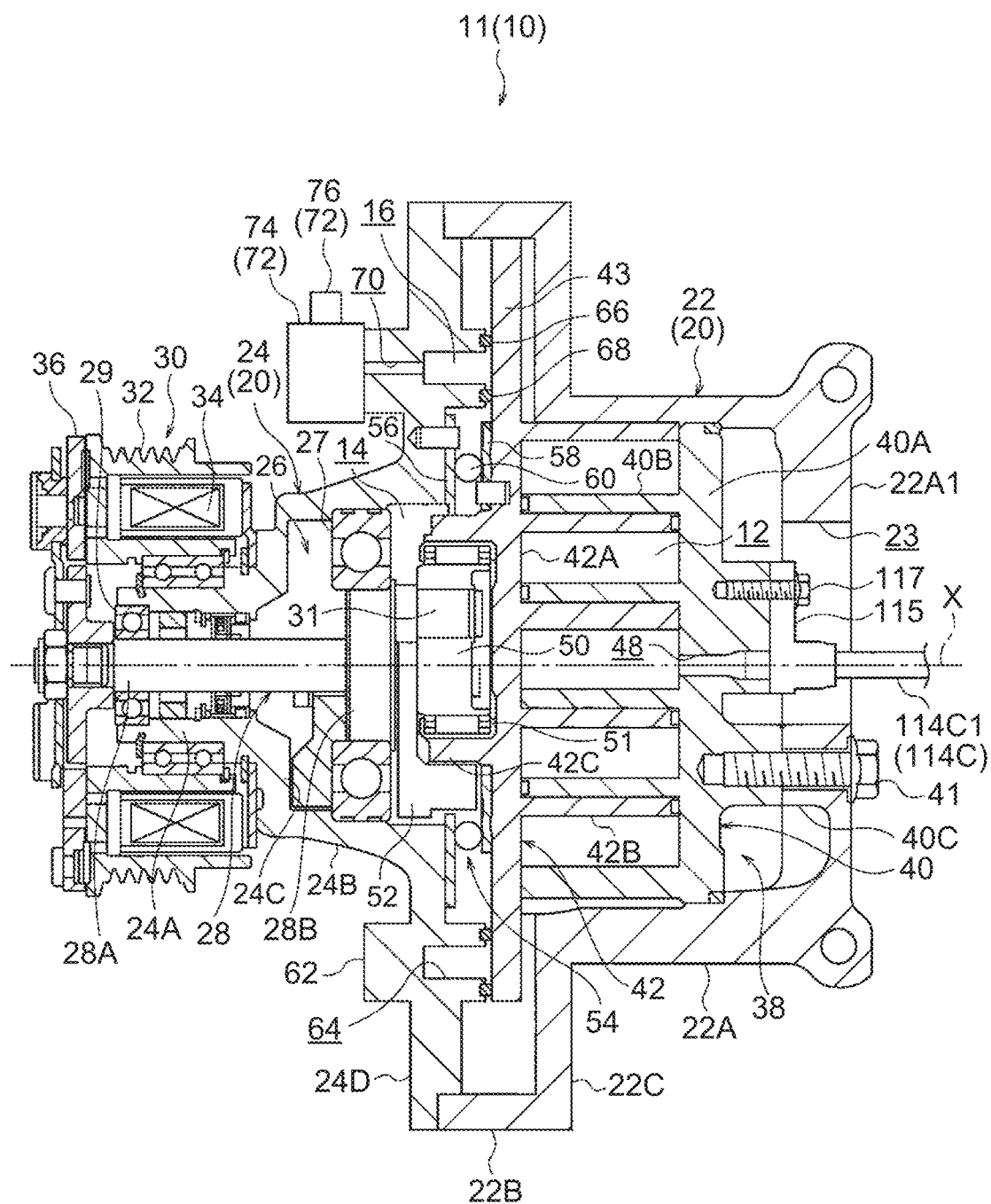
FIG. 3 is a sectional view showing the configuration of an expander according to the first embodiment.
Figure 4:
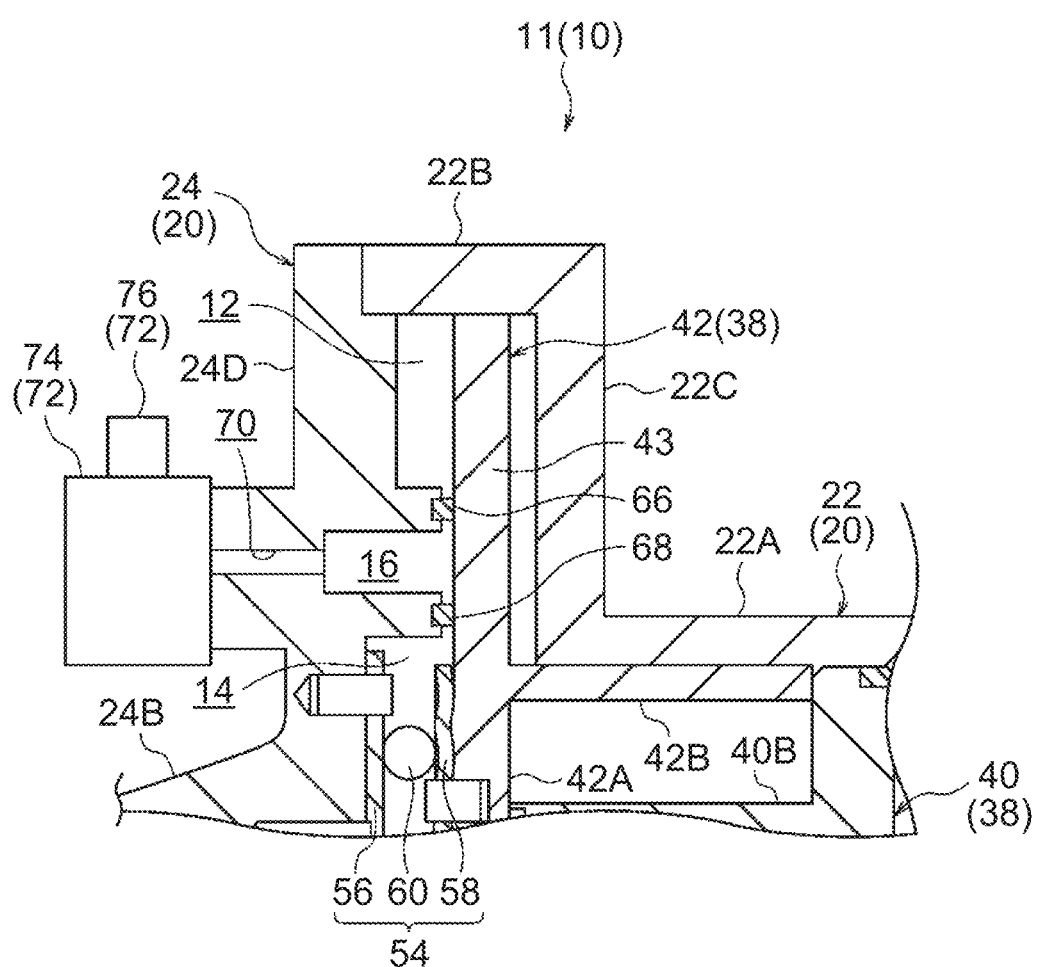
FIG. 4 is an enlarged sectional view showing a close-up of a part of FIG. 3.
Figure 5:
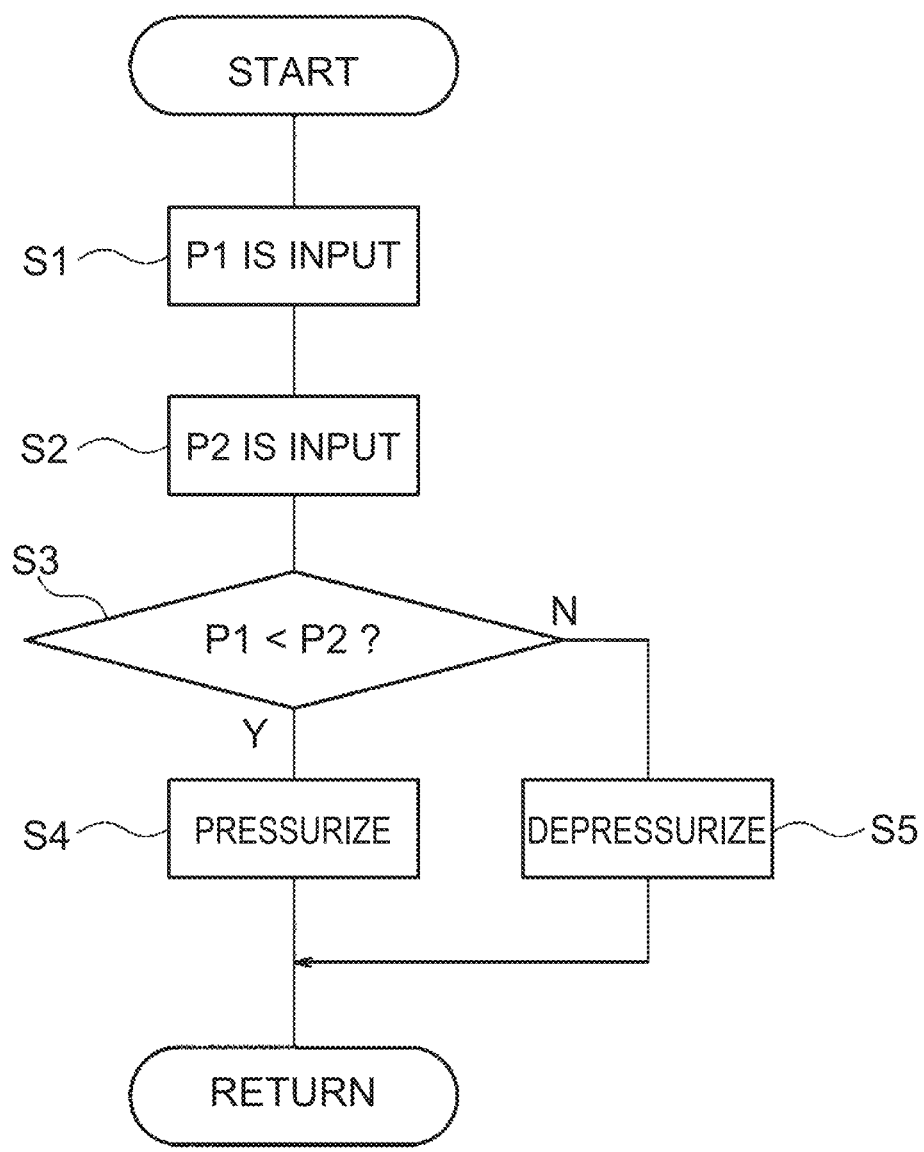
FIG. 5 is a flowchart illustrating feedback control exerted by a control unit over a pressurizing unit.

As shown in FIG. 3 and FIG. 4, the hydrogen expander 11 is a scroll expander including an expanding chamber 12, a driving chamber 14, and an intermediate chamber 16. As described above, the hydrogen expander 11 is used in the fuel cell system 100 to enhance the performance of cooling the fuel cell stack 102 by using cold heat resulting from adiabatic expansion of fuel hydrogen. The hydrogen expander 11 includes a housing 20, a driving mechanism (power recovery mechanism) 26, the electromagnetic clutch 30, a scroll mechanism 38, a first seal member 66, and a second seal member 68.

The driving mechanism 26 is of oil-lubricated type, and has a shaft 28 that is a rotating shaft, a driving pin 31, ball bearings 27, 29, a bush 50, a needle bearing 51, a balance weight 52, and a thrust bearing 54. The driving mechanism 26 is housed in the driving chamber 14 formed inside the housing 20. Oil (lubricating oil) for lubricating the driving mechanism 26 is present in the driving chamber 14. The internal pressure of the driving chamber 14 is set to be equal to the atmospheric pressure.

The scroll mechanism 38 has a fixed scroll 40 and a movable scroll 42. The movable scroll 42 is provided with an extended portion 43 extending toward a radially outer side. The scroll mechanism 38 is housed in the expanding chamber 12 formed inside the housing 20. High-pressure hydrogen that is a working fluid is introduced into the expanding chamber 12. The hydrogen introduced into the expanding chamber 12 is adiabatically expanded and then discharged from the expanding chamber 12. The intermediate chamber 16 is interposed between the expanding chamber 12 and the driving chamber 14. A gap between the intermediate chamber 16 and the expanding chamber 12 is sealed by the first seal member 66, and a gap between the intermediate chamber 16 and the driving chamber 14 is sealed by the second seal member 68. Each of these components will be described in detail below.

The housing 20 is composed of a rear housing 22 in which the expanding chamber 12 is formed, and a front housing 24 in which the driving chamber 14 is formed. The rear housing 22 has a shape of a stepped cylinder closed on one side, and has: a small-diameter cylindrical part 22A having a shape of a cylinder closed on one side and having a bottom wall 22A1; a large-diameter cylindrical part 22B having a cylindrical shape; and a step part 22C connecting the cylindrical parts 22A, 22B to each other in a radial direction. The front housing 24 has a shape of a stepped cylinder with a smaller diameter than the rear housing 22, and has: a small-diameter cylindrical part 24A and a large-diameter cylindrical part 24B that have a cylindrical shape; a step part 24C connecting the cylindrical parts 24A, 24B to each other in the radial direction; and a flange part 24D extending radially outward from an open end of the large-diameter cylindrical part 24B on the opposite side from the small-diameter cylindrical part 24A. The rear housing 22 and the front housing 24 are concentrically fixed to each other with the flange part 24D and an open end of the large-diameter cylindrical part 22B fitted together. The intermediate chamber 16 is formed between the flange part 24D and the extended portion 43 of the movable scroll 42. A central axis X of the housing 20 extends, for example, in a horizontal direction or a substantially horizontal direction of the vehicle (fuel cell electric vehicle; not shown).

The shaft 28 is provided on the central axis X. The shaft 28 extends into the housing 20 by passing through an inside of the small-diameter cylindrical part 24A of the front housing 24. The shaft 28 includes a small-diameter part 28A surrounded by the small-diameter cylindrical part 24A of the front housing 24, and a large-diameter part 28B surrounded by the large-diameter cylindrical part 24B of the front housing 24. The driving pin 31 extending parallel to the central axis X is fixed to an end surface of the large-diameter part 28B on the opposite side from the small-diameter part 28A, at an eccentric position a predetermined distance away from the central axis X. The driving pin 31 is disposed parallel to the shaft 28. The large-diameter part 28B of the shaft 28 is rotatably supported by the large-diameter cylindrical part 24B of the front housing 24 through the ball bearing 27, while the small-diameter part 28A of the shaft 28 is rotatably supported by the small-diameter cylindrical part 24A of the front housing 24 through the ball bearing 29.

The electromagnetic clutch 30 is provided on a radially outer side of the small-diameter cylindrical part 24A of the front housing 24. The electromagnetic clutch 30 is rotatably fitted on an outer side of the small-diameter cylindrical part 24A of the front housing 24. The electromagnetic clutch 30 includes, for example: a pulley 32 that is connected to an object to be driven (here, the fan 116 shown in FIG. 1) through a power transmitting member, such as a V-belt (not shown); an exciting coil 34 fixed to the small-diameter cylindrical part 24A of the front housing 24; and a rotation transmitting plate 36 fixed to an end of the small-diameter part 28A of the shaft 28. Rotation of the shaft 28 is transmitted to the fan 116 through the electromagnetic clutch 30 etc., causing the fan 116 to rotate.

The rear housing 22 houses the scroll mechanism 38 including the fixed scroll 40 that is fixed to the rear housing 22 and the movable scroll 42 that performs revolving turning movements (turns and slides) relatively to the fixed scroll 40. The fixed scroll 40 has a disc-shaped end plate 40A that is provided so as to be centered on the central axis X and fits in the rear housing 22, a spiral wall 40B having a spiral shape that stands on one surface of the end plate 40A, and a leg 40C formed on the other surface of the end plate 40A. The fixed scroll 40 is fixed to the rear housing 22 with a bolt 41, with the leg 40C in contact with a bottom wall of the rear housing 22.

The movable scroll 42 as a movable member (revolving member) is provided inside the rear housing 22, adjacent to the fixed scroll 40. The movable scroll 42 has a disc-shaped end plate 42A, a spiral wall 42B having a spiral shape that stands on one surface of the end plate 42A, and an annular boss 42C formed on the other surface of the end plate 42A. A central axis (not shown) of the end plate 42A of the movable scroll 42 is disposed at an eccentric position a predetermined distance away from the central axis X of the housing 20 and extends parallel to the central axis X.

The spiral wall 42B of the movable scroll 42 and the spiral wall 40B of the fixed scroll 40 have a spiral shape as seen from the direction of the central axis X and mesh with each other with a 180° angular shift. Sliding surfaces of the fixed scroll 40 and the movable scroll 42 are free of oil and the like. The revolving turning movements of the movable scroll 42 relative to the fixed scroll 40 are such that the central axis of the end plate 42A revolves around the central axis X while the distance between the central axis of the end plate 42A and the central axis X remains the same. Hereinafter, these revolving turning movements may be referred to simply as "revolution."

The end plate 42A of the movable scroll 42 divides an internal space of the housing 20 into the expanding chamber 12 and the driving chamber 14. A through-hole 48 that is an introduction port through which hydrogen is introduced into the expanding chamber 12 is formed at a central part of the end plate 40A of the fixed scroll 40. A passage connecting member 115 with which a downstream-side end of the upstream part 114C1 of the bypass passage 114C is engaged is fixed (here, fastened with a bolt 117) to the central part of the end plate 40A. Thus, the downstream-side end of the upstream part 114C1 communicates with the expanding chamber 12 through the through-hole 48. A portion of the central part of the end plate 40A at which the passage connecting member 115 is fixed is a boss (reference sign omitted) that protrudes toward the opposite side from the movable scroll 42. A working hole 23 through which the passage connecting member 115 is inserted into the rear housing 22 is formed in the bottom wall 22A1 of the rear housing 22. The expanding chamber 12 communicates with a discharge port (not shown) formed in the rear housing 22. An upstream-side end of the intermediate part 114C2 of the bypass passage 114C is connected to this discharge port.

Hydrogen flowing through the upstream part 114C1 is introduced through the through-hole 48 into the expanding chamber 12 (a center side thereof between the spiral wall 40B and the spiral wall 42B). The hydrogen introduced into the expanding chamber 12 expands between the spiral wall 40B and the spiral wall 42B while causing the movable scroll 42 to revolve relatively to the fixed scroll 40, and flows toward an outer circumferential side of the spiral wall 40B and the spiral wall 42B to be discharged to the intermediate part 114C2 through the discharge port.

The bush 50 having a thick disc shape and provided concentrically with the end plate 42A is rotatably fitted on an inner side of the boss 42C of the movable scroll 42 through the needle bearing 51. An eccentric through-hole (reference sign omitted) extending parallel to the central axis X is formed in the bush 50, and the balance weight 52 extending radially outward is fixed to the bush 50. The driving pin 31 fixed to the large-diameter part 28B of the shaft 28 is inserted into the eccentric through-hole so as to be able to rotate and slide. A pin (not shown) formed on the bush 50 is fitted in a hole having a slightly larger diameter than the pin formed at the end of the large-diameter part 28B of the shaft 28.

The thrust bearing 54 is provided between the end plate 42A of the movable scroll 42 and the large-diameter cylindrical part 24B of the front housing 24, on the opposite side of the movable scroll 42 from the fixed scroll 40. The thrust bearing 54 has a fixed-side race 56 that is fixed to an end of the large-diameter cylindrical part 24B of the front housing 24, a movable-side race 58 that is fixed to the end plate 42A of the movable scroll 42, and a plurality of balls 60 interposed between the fixed-side race 56 and the movable-side race 58 at intervals in a circumferential direction of the housing 20. The thrust bearing 54 functions to bear a thrust load of the movable scroll 42 as well as to serve as a rotation preventing mechanism that prevents the movable scroll 42 from rotating. While the thrust bearing 54 is a component of the driving mechanism 26 in this embodiment, the thrust bearing 54 may instead be regarded as a component of the scroll mechanism 38.

The fixed-side race 56 and the movable-side race 58 are manufactured, for example, by pressing a steel plate and have an annular shape. Each of the fixed-side race 56 and the movable-side race 58 has a plurality of annular rolling grooves (reference sign omitted) formed in one surface at intervals in a circumferential direction. Each ball 60 is made of, for example, a steel material and has a spherical shape, and is interposed between the fixed-side race 56 and the movable-side race 58 in a state of being held between the rolling groove of the fixed-side race 56 and the opposite rolling groove of the movable-side race 58. As the movable scroll 42 revolves relatively to the fixed scroll 40, the balls 60 roll along the rolling grooves so as to follow a circular path with substantially the same diameter as the radius of revolution of the movable scroll 42. The movable scroll 42 is prevented from rotating as the range of rolling of the balls 60 is limited to inside the rolling groove. Alternatively, a rotation preventing mechanism that prevents the movable scroll 42 from rotating may be provided separately from the thrust bearing 54.

The extended portion (jutting portion) 43 integrally extends (juts out) from an outer circumference of the end plate 42A of the movable scroll 42 toward a radially outer side of the movable scroll 42. The extended portion 43 is formed by extending the end plate 42A toward the radially outer side, and has a plate shape similar to that of the end plate 42A and an annular shape concentric with the end plate 42A as seen from an axial direction of the movable scroll 42. The extended portion 43 is housed inside the large-diameter cylindrical part 22B of the rear housing 22. The outside diameter of the extended portion 43 is set to be smaller than the inside diameter of the large-diameter cylindrical part 22B. As described above, the central axis of the movable scroll 42 provided with the extended portion 43 is disposed at an eccentric position away from the central axis X of the housing 20. Part of an outer circumferential surface of the extended portion 43 is disposed in contact with or close to an inner circumferential surface of the large-diameter cylindrical part 22B. This part of the outer circumferential surface of the extended portion 43 that is in contact with or close (closest) to the inner circumferential surface of the large-diameter cylindrical part 22B circles (moves) along the inner circumferential surface of the large-diameter cylindrical part 22B as the movable scroll 42 revolves.

The extended portion 43 is disposed between the step part 22C of the rear housing 22 and the flange part 24D of the front housing 24. An annular protrusion 62 protruding toward both sides in the direction of the central axis X is formed at a radially intermediate portion of the flange part 24D. The annular protrusion 62 has an annular shape centered on the central axis X as seen from the direction of the central axis X. A portion of the flange part 24D at which the annular protrusion 62 is formed has a larger thickness in the direction of the central axis X than the rest of the flange part 24D. The annular protrusion 62 is disposed such that an end portion (end surface) thereof that is on the side of the extended portion 43 and located inside the housing 20 is close to the extended portion 43. The annular protrusion 62 is formed at such a position that the annular protrusion 62 always faces the extended portion 43 in the direction of the central axis X during revolution of the movable scroll 42.

An annular groove 64 opening toward the extended portion 43 (movable scroll 42) is formed in the annular protrusion 62. The annular groove 64 is a groove having an annular shape centered on the central axis X, and is disposed facing the extended portion 43 from the opposite side from the fixed scroll 40. This annular groove 64 forms the intermediate chamber 16 between the flange part 24D and the extended portion 43.

The first seal member 66 and the second seal member 68 are mounted on the end (end surface) of the annular protrusion 62 on the side of the extended portion 43. The first seal member 66 is made of a resin having a self-lubricating property, such as polytetrafluoroethylene (PTFE), and is formed in a ring shape that is concentric with the annular protrusion 62 and has a somewhat larger diameter than the annular groove 64. The second seal member 68 is made of rubber, such as ethylene propylene diene rubber (EPDM), and is formed in a ring shape that is concentric with the annular protrusion 62 and has a somewhat smaller diameter than the annular groove 64.

The seal members 66, 68 are mounted on the front housing 24 by being fitted into annular grooves formed in the end surface of the annular protrusion 62 on the side of the extended portion 43. The seal members 66, 68 are in contact with the movable scroll 42 and seal gaps between the movable scroll 42 and the flange part 24D (housing 20). The first seal member 66 seals a gap between the expanding chamber 12 and the intermediate chamber 16, and the second seal member 68 seals a gap between the driving chamber 14 and the intermediate chamber 16. A space separated from the expanding chamber 12 and the driving chamber 14 by the seal members 66, 68 is the intermediate chamber 16. The intermediate chamber 16 is formed between the housing 20 that is an immovable member and the movable scroll 42 that is a movable member. The internal volume of the intermediate chamber 16 does not change during operation of the hydrogen expander 11 (during revolution of the movable scroll 42).

The intermediate chamber 16 is filled with a pressurized fluid. This pressurized fluid is a different type of fluid from hydrogen that is the working fluid of the hydrogen expander 11. Specifically, the pressurized fluid is nitrogen, helium, water, or a coolant.

The annular groove 64 (intermediate chamber 16) communicates with an outside of the housing 20 through a pressure introducing port 70 formed in the annular protrusion 62. The pressure introducing port 70 is a through-hole extending in the direction of the central axis X and extends toward the opposite side of the annular groove 64 from the extended portion 43. The pressure introducing port 70 corresponds to the pressurizing device 74.

The pressurizing device 74 is, for example, a cylinder device or a pump, and is fixed to an end of the annular protrusion 62 on the outside of the housing 20. The pressurizing device 74 can pressurize the pressurized fluid filling the intermediate chamber 16. In the configuration of this embodiment, the intermediate chamber 16 and the pressurizing device 74 are disposed on the side of the driving mechanism 26 relative to the movable scroll 42 (the opposite side from the fixed scroll 40), but the present disclosure is not limited to this configuration. Another configuration may be adopted in which the intermediate chamber 16 and the pressurizing device 74 are disposed on the side of the fixed scroll 40 relative to the movable scroll 42, i.e., for example, the intermediate chamber 16 is formed at the step part 22C of the rear housing 22 and the pressurizing device 74 is fixed to the step part 22C.

The first pressure sensor 76 that detects a pressure P1 of the pressurized fluid is provided on the pressurizing device 74. The first pressure sensor 76 is electrically connected to the control unit 142. In addition to the first pressure sensor 76, the second pressure sensor 78 is electrically connected to the control unit 142. The second pressure sensor 78 is connected to the intermediate part 114C2 of the bypass passage 114C, for example, between the hydrogen expander 11 and the sub-tank 127. The second pressure sensor 78 detects a pressure P2 of hydrogen discharged from the hydrogen expander 11 (hereinafter referred to as "the discharge pressure P2 of hydrogen"). The control unit 142 controls the pressurizing device 74 based on detection results of the pressure sensors 76, 78. Feedback control that is an example of control that the control unit 142 exerts over the pressurizing device 74 will be described using the flowchart shown in FIG. 5.

First, in step S1, the control unit 142 detects the pressure P1 of the pressurized fluid based on an input from the first pressure sensor 76. Next, in step S2, the control unit 142 detects the discharge pressure P2 of hydrogen based on an input from the second pressure sensor 78. Then, in step S3, the control unit 142 determines whether or not the pressure P1 of the pressurized fluid is lower than the discharge pressure P2 of hydrogen. When this is determined in the affirmative, the control unit 142 moves to step S4, and when this is determined in the negative, the control unit 142 moves to step S5. In step S4, the control unit 142 pressurizes the pressurized fluid by the pressurizing device 74. In step S5, the control unit 142 depressurizes the pressurized fluid by the pressurizing device 74. Upon completing the process in step S4 or step S5, the control unit 142 returns to step S1 and repeats the same sequence of processes.

By the above sequence of processes, the control unit 142 adjusts the pressure P1 of the pressurized fluid in conjunction with the discharge pressure P2 of the hydrogen so as to minimize the difference between the pressure P1 of the pressurized fluid (i.e., the internal pressure of the intermediate chamber 16) and the discharge pressure P2 of the hydrogen. Thus, in this embodiment, the pressurized fluid filling the intermediate chamber 16 is pressurized to a pressure equal to the pressure of the hydrogen discharged from the expanding chamber 12 (a pressure higher than the internal pressure of the driving chamber 14).

Workings and Effects

Next, the workings and effects of this embodiment will be described.

In the fuel cell system 100 configured as described above, hydrogen held in the hydrogen tank 112 is supplied to the fuel cell stack 102 through the hydrogen supply passage 114. The fuel cell stack 102 generates electricity by causing an electrochemical reaction between the hydrogen supplied thereto and oxygen in the air. The hydrogen expander 11 constituting the main body of the expander 10 is connected to some point in the hydrogen supply passage 114. In the hydrogen expander 11, the hydrogen introduced into the expanding chamber 12 is adiabatically expanded and then discharged from the expanding chamber 12. The expansion energy of the hydrogen drives the driving mechanism 26 housed in the driving chamber 14. The fan 116 is driven by driving force of the driving mechanism 26. The fan 116 blows air toward the radiator 106 that cools the coolant of the fuel cell stack 102. Thus, the cooling performance of the radiator 106, i.e., the performance of cooling the fuel cell stack 102, can be enhanced. Further, the hydrogen supply passage 114 is in contact with the heat exchanger 110 on the downstream side of the hydrogen expander 11. In the heat exchanger 110, heat exchange occurs between the hydrogen having been cooled by undergoing adiabatic expansion and the coolant circulating through the cooling passage 104. Thus, the performance of cooling the fuel cell stack 102 can be further enhanced.

In this embodiment, the intermediate chamber 16 is interposed between the expanding chamber 12 and the driving chamber 14 of the hydrogen expander 11. The gap between the intermediate chamber 16 and the expanding chamber 12 is sealed by the first seal member 66, and the gap between the intermediate chamber 16 and the driving chamber 14 is sealed by the second seal member 68. The pressurized fluid filling the intermediate chamber 16 is pressurized by the pressurizing unit 72. Thus, the difference in the internal pressure between the expanding chamber 12 and the intermediate chamber 16 can be made smaller than that between the expanding chamber 12 and the driving chamber 14, and the differential pressure acting on the first seal member 66 can be reduced accordingly. As a result, hydrogen is less likely to leak from the expanding chamber 12 to the intermediate chamber 16. Moreover, as the internal pressure of the intermediate chamber 16 becomes higher than the internal pressure of the driving chamber 14, oil is less likely to leak from the driving chamber 14 to the intermediate chamber 16. Thus, the likelihood of fluid leakage between the expanding chamber 12 and the driving chamber 14 can be effectively reduced.

The oil leakage may occur due to leakage of hydrogen from the expanding chamber 12 to the driving chamber 14. Specifically, during operation of the hydrogen expander 11, high-pressure hydrogen is introduced to the center side of the expanding chamber 12, while depressurized and expanded hydrogen flows to the outer circumferential side of the expanding chamber 12 (the side of the discharge port (not shown)). Thus, a differential pressure occurs inside the expanding chamber 12 between the center side and the outer circumferential side. Once the hydrogen expander 11 stops, however, the hydrogen leaks inside the expanding chamber 12 and the pressure inside the expanding chamber 12 becomes equalized, with the pressure on the outer circumferential side (discharge port side) of the expanding chamber 12 rising. As a result, the hydrogen may leak from the expanding chamber 12 to the driving chamber 14, raising the internal pressure of the driving chamber 14. In this case, when the hydrogen expander 11 is started, the pressure on the outer circumferential side of the expanding chamber 12 decreases temporarily, so that the internal pressure of the driving chamber 14 becomes higher than the internal pressure of the expanding chamber 12, which is likely to cause the oil inside the driving chamber 14 to leak to the expanding chamber 12.

Eliminating leakage of hydrogen and oil as described above by the sealing force of a seal member alone requires measures such as employing multiple seals or increasing the sealing pressure. However, such measures raise secondary problems, including sliding resistance and wearing. The configuration of this embodiment, by contrast, reduces the likelihood of fluid leakage between the expanding chamber 12 and the driving chamber 14 by achieving a pressure balance among the expanding chamber 12, the intermediate chamber 16, and the driving chamber 14, and therefore does not raise such problems.

In this embodiment, since lubricating the hydrogen expander 11 does not involve mixing oil into hydrogen that is the working fluid, a situation where oil (foreign substance) mixed into hydrogen enters the fuel cell stack 102 can be prevented. Specifically, it is common practice in a compressor of an air conditioner etc. to add oil to a cooling medium (working fluid) and recover the oil after compressing the cooling medium. Thus using a mixture of a working fluid and oil is an easy and effective way to lubricate a device as well as seal a gap between closed spaces. However, mixing oil into the fuel hydrogen supplied to the fuel cell stack 102 poses problems from the viewpoint of preventing contamination. This embodiment can avoid such problems.

In this embodiment, the scroll mechanism 38 is provided inside the expanding chamber 12 of the hydrogen expander 11. In the scroll mechanism 38, hydrogen expands between the fixed scroll 40 and the movable scroll 42, and the movable scroll 42 performs revolving turning movements relatively to the fixed scroll 40. The annular groove 64 forming the intermediate chamber 16 is formed in the housing 20 of the hydrogen expander 11 so as to face the movable scroll 42, and the first seal member 66 and the second seal member 68 are provided one on each side of the annular groove 64 in the radial direction between the housing 20 and the movable scroll 42. The gap between the expanding chamber 12 and the intermediate chamber 16, and the gap between the driving chamber 14 and the intermediate chamber 16 are sealed by the seal members 66, 68, and the pressurized fluid filling the intermediate chamber 16 is pressurized by the pressurizing unit 72. Thus, the likelihood of fluid leakage inside the housing 20 of the hydrogen expander 11 that is a scroll expander can be effectively reduced by a simple configuration.

In this embodiment, the pressure P1 of the pressurized fluid filling the intermediate chamber 16 is detected by the first pressure sensor 76, and the discharge pressure P2 of the hydrogen discharged from the expanding chamber 12 is detected by the second pressure sensor 78. The control unit 142 controls the pressurizing device 74 based on detection results of the pressure sensors 76, 78, and the pressurizing device 74 pressurizes the pressurized fluid. Thus, feedback control can be performed on the pressure P2 of the pressurized fluid according to the discharge pressure P1 of the hydrogen discharged from the expanding chamber 12, and the difference between the discharge pressure P1 and the pressure P2 of the pressurized fluid, i.e., the difference between the internal pressure of the expanding chamber 12 on the discharge port side and the internal pressure of the intermediate chamber 16, can be virtually minimized, and the differential pressure acting on the first seal member 66 can be thereby minimized In this embodiment, the working fluid and the pressurized fluid of the hydrogen expander 11 are fluids of different types. Specifically, hydrogen that is troublesome to safely manage is used as the working fluid, while a safe fluid such as nitrogen, helium, water, or a coolant is used as the pressurized fluid. Thus, the pressurized fluid is easy to safely manage. Moreover, when the pressurized fluid is a gas, such as nitrogen or helium, weight reduction can be achieved compared with when the pressurized fluid is a liquid. When the pressurized fluid is a liquid, such as water or a coolant, an abnormality, for example, leakage is easy to detect compared with when the pressurized fluid is a gas.

Second Embodiment

Next, a second embodiment of the present disclosure will be described. Those configurations and functions that are basically the same as in the first embodiment will be denoted by the same reference signs as in the first embodiment and the description thereof will be omitted.

Figure 6:
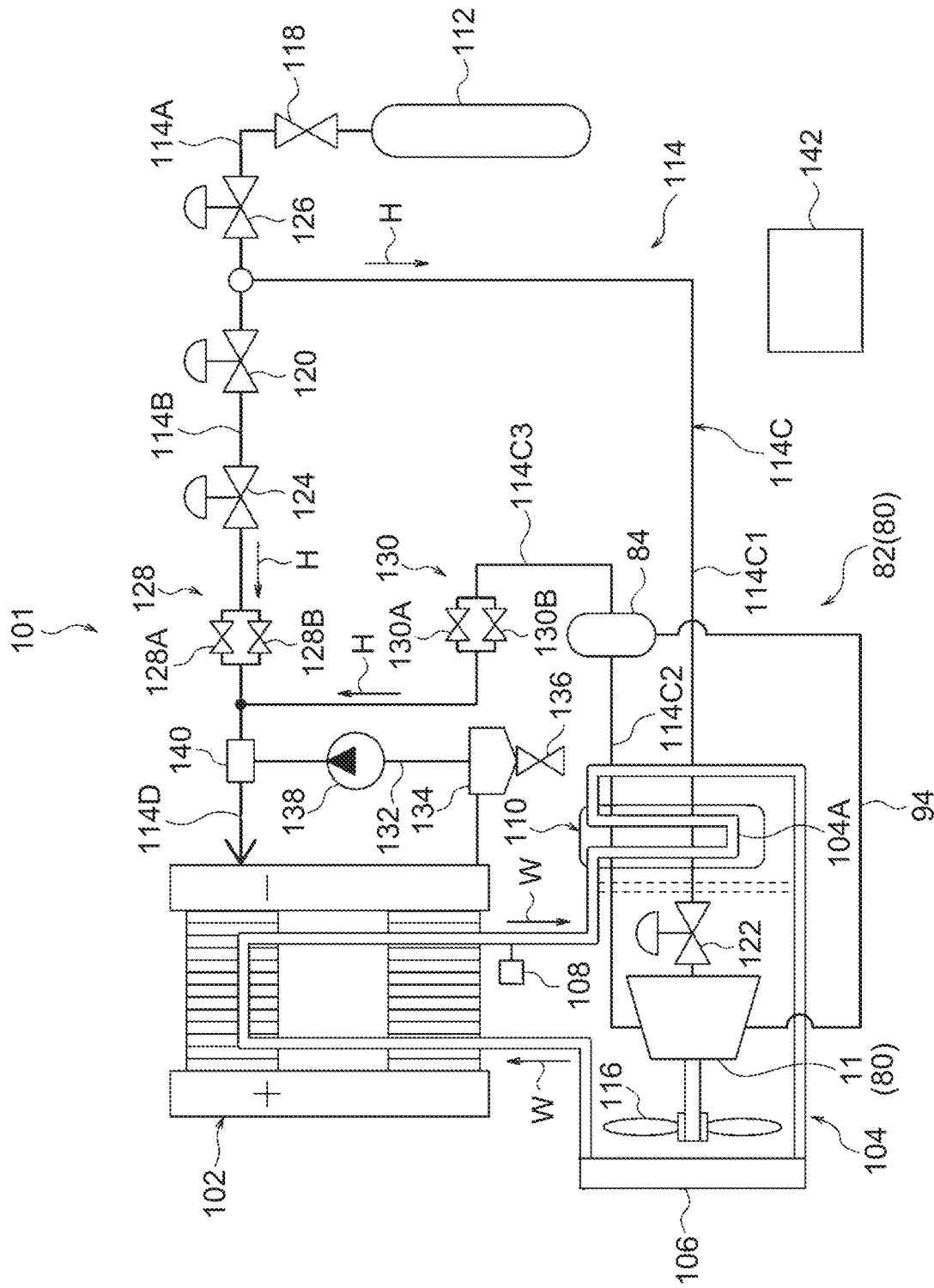
FIG. 6 is a configuration diagram showing an example of the schematic configuration of a fuel cell system according to a second embodiment of the present disclosure.

FIG. 6 is a configuration diagram showing an example of the schematic configuration of a fuel cell system 101 according to the second embodiment of the present disclosure. The fuel cell system 101 includes an expander 80 that is different from the expander 10 according to the first embodiment. The expander 80 is composed of the same hydrogen expander 11 as the hydrogen expander 11 according to the first embodiment and a pressurizing unit 82 that is different from the pressurizing unit 72 according to the first embodiment. The pressurizing unit 82 according to this embodiment includes a sub-tank 84 that is different from the sub-tank 127 according to the first embodiment, the intermediate part 114C2 of the bypass passage 114C, and a pressurizing passage 94. In this embodiment, the sub-tank 127, the pressurizing device 74, the first pressure sensor 76, and the second pressure sensor 78 according to the first embodiment are omitted.

The sub-tank 84 corresponds to the "tank" in the present disclosure. As with the sub-tank 127 according to the first embodiment, the sub-tank 84 is connected to some point in the bypass passage 114C (hydrogen supply passage 114) between the hydrogen expander 11 and the fuel cell stack 102.

Figure 7:
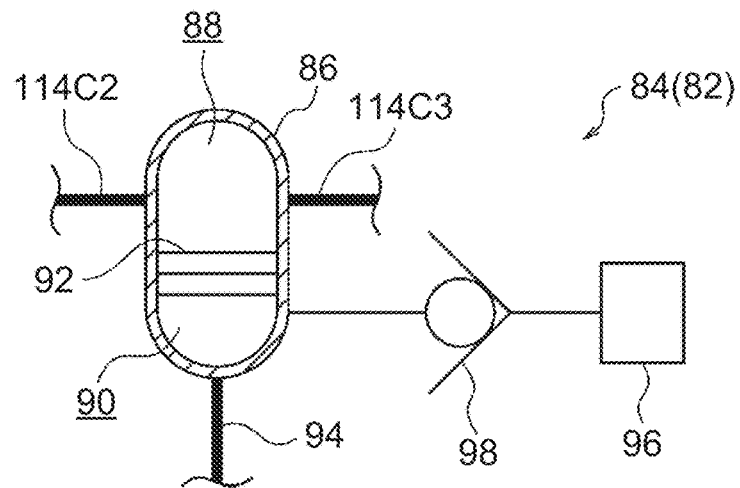
FIG. 7 is a sectional view showing the configuration of a sub-tank as a tank.

As shown in FIG. 7, the sub-tank 84 has a tank main body (pressure-resistant container) 86 having an elongated hollow shape. For example, a section of the tank main body 86 as seen from a longitudinal direction has a circular shape, and a section thereof as seen from a direction orthogonal to the longitudinal direction has an elliptical shape. A pressure transmitting part 92 is provided inside of the tank main body 86, at an intermediate portion in the longitudinal direction. The pressure transmitting part 92 is, for example, a piston or a diaphragm, and divides the inside of the tank main body 86 into a first chamber 88 and a second chamber 90. The pressure transmitting part 92 can transmit the internal pressure of the first chamber 88 to the second chamber 90.

A downstream-side end of the intermediate part 114C2 of the bypass passage 114C and an upstream-side end of the downstream part 114C3 of the bypass passage 114C are connected to one end in the longitudinal direction of the tank main body 86 at which the first chamber 88 is formed. The first chamber 88 communicates with the discharge port of the expanding chamber 12 of the hydrogen expander 11 through the intermediate part 114C2. Hydrogen discharged from the expanding chamber 12 is introduced into (passes through) the first chamber 88. Thus, during operation (running) of the hydrogen expander 11, the internal pressure of the first chamber 88 becomes equal to the pressure of the hydrogen discharged from the expanding chamber 12.

Figure 8:
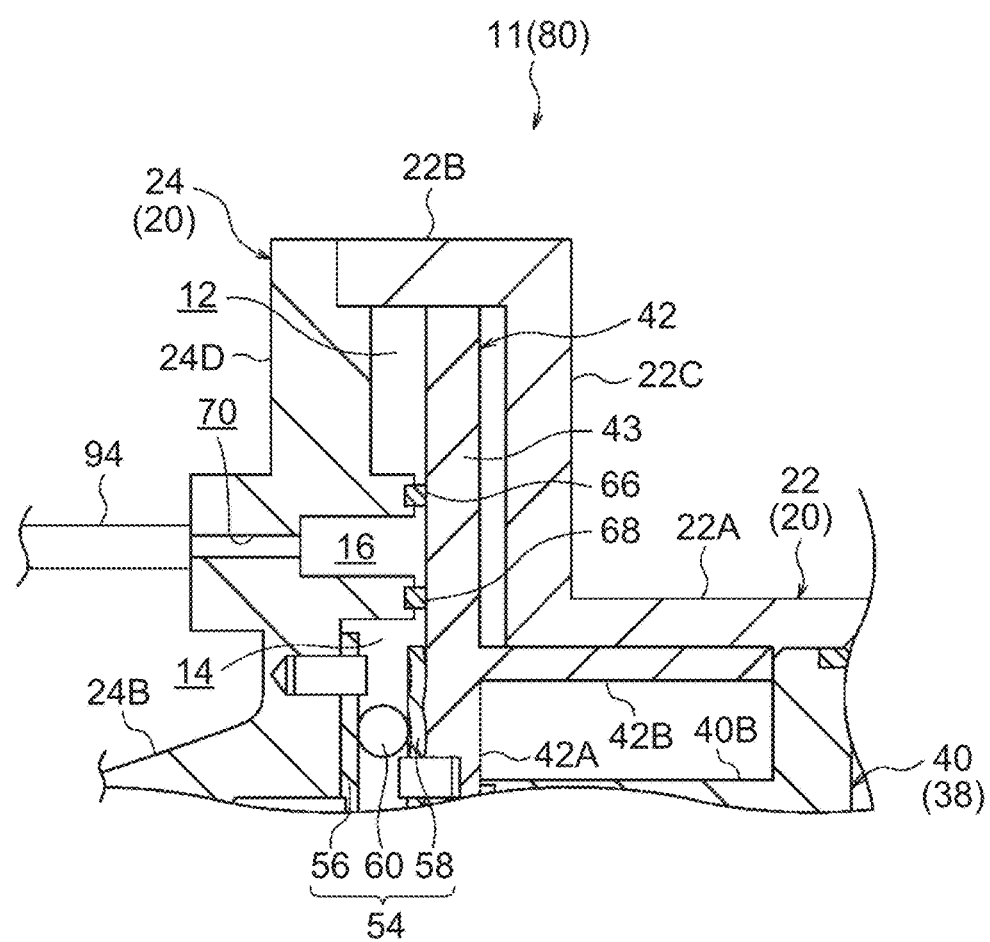
FIG. 8 is a sectional view showing the configuration of a part of an expander according to the second embodiment.

One end of the pressurizing passage 94 is connected to the other end in the longitudinal direction of the tank main body 86 at which the second chamber 90 is formed. The pressurizing passage 94 is formed by a pipe, and the other end of the pressurizing passage 94 is connected to the pressure introducing port 70 (see FIG. 8) of the hydrogen expander 11. Thus, the second chamber 90 and the intermediate chamber 16 of the hydrogen expander 11 communicate with each other through the pressurizing passage 94. A filling port 96 through which the second chamber 90 is filled with the pressurized fluid (compensating pressurized fluid), and a check valve 98 that prevents the pressurized fluid inside the second chamber 90 from flowing back toward the filling port 96 are provided at the other end of the tank main body 86 in the longitudinal direction. In FIG. 7, the filling port 96 and the check valve 98 are schematically depicted. The pressurized fluid filling the second chamber 90 through the filling port 96 also fills the pressurizing passage 94 and the intermediate chamber 16 of the hydrogen expander 11. The pressurized fluid is a fluid similar to the pressurized fluid according to the first embodiment.

This pressurized fluid is pressurized using the pressure of the hydrogen inside the first chamber 88 transmitted through the pressure transmitting part 92. Thus, in this embodiment, the pressurized fluid pressurized using the pressure of the working fluid discharged from the expanding chamber 12 of the hydrogen expander 11 is introduced into the intermediate chamber 16 of the hydrogen expander 11. The pressure of the pressurized fluid thus pressurized is set to be equal to or lower than the pressure of the hydrogen discharged from the expanding chamber 12 and higher than the internal pressure of the driving chamber 14 (which is equal to the atmospheric pressure). Thus, in this embodiment, the pressurized fluid pressurized to a pressure equal to or lower than the pressure of the hydrogen discharged from the expanding chamber 12 and higher than the internal pressure of the driving chamber 14 is introduced into the intermediate chamber 16. The other configurations in this embodiment are the same as in the first embodiment.

Also in this embodiment, the pressurized fluid filling (introduced into) the intermediate chamber 16 of the hydrogen expander 11 is pressurized by the pressurizing unit 82. Thus, as in the first embodiment, the likelihood of fluid leakage between the expanding chamber 12 and the driving chamber 14 can be effectively reduced.

Moreover, in this embodiment, the pressurizing unit 82 has the sub-tank 84 that is connected to the hydrogen supply passage 114 between the hydrogen expander 11 and the fuel cell stack 102. The sub-tank 84 has the first chamber 88 communicating with the discharge port of the expanding chamber 12, the second chamber 90 communicating with the intermediate chamber 16, and the pressure transmitting part 92 that transmits the internal pressure of the first chamber 88 to the second chamber 90. Hydrogen discharged from the expanding chamber 12 is introduced into the first chamber 88, and the second chamber 90 is filled with the pressurized fluid. The pressurized fluid is pressurized as the pressure of the hydrogen introduced into the first chamber 88 is transmitted thereto through the pressure transmitting part. Thus, in this embodiment, the pressurizing unit 82 pressurizes the pressurized fluid using the pressure of the hydrogen discharged from the expanding chamber 12. Therefore, the configuration of the pressurizing unit 82 can be simplified, as there is no need for the pressurizing device 74 and the configuration for controlling the pressurizing device 74 according to the first embodiment.

In this embodiment, the second chamber 90 can be filled with the pressurized fluid through the filling port 96 of the sub-tank 84. Thus, the pressurized fluid can be replenished when, for example, the pressurized fluid has leaked from the intermediate chamber 16.

Supplementary Description of Embodiments

In the above embodiments, the example in which the expanders 10, 80 are employed as components of the fuel cell systems 100, 101 have been described, but the present disclosure is not limited to this example. The expander according to the present disclosure is also applicable, for example, to an expander that is a component of a refrigerating machine.

In the above embodiments, the case where the working fluid and the pressurized fluid of the expanders 10, 80 are fluids of different types have been described, but the present disclosure is not limited to this case. The working fluid and the pressurized fluid may be fluids of the same type.

In the above embodiments, the case where the hydrogen expander 11 constituting the main body of the expanders 10, 80 is a scroll expander has been described, but the present disclosure is not limited to this example. The main body of the expander according to the present disclosure may instead be, for example, a turbine expander. In this case, an intermediate chamber is formed, for example, between an immovable member (fixed member) and a movable member of the turbine expander.

In the second embodiment, the pressurizing unit 82 includes the sub-tank 84, but the present disclosure is not limited to this example. For example, a cylinder device of the pressurizing unit may be mounted on the housing 20, and hydrogen discharged from the expanding chamber 12 may be introduced into the cylinder device, and the pressurized fluid inside the intermediate chamber 16 may be pressurized by the cylinder device.

In the above embodiments, the case where the fuel cell systems 100, 101 are installed in the vehicle (fuel cell electric vehicle) has been described, but the present disclosure is not limited to this case. The fuel cell system according to the present disclosure may instead be, for example, a household fuel cell system.

The present disclosure can be implemented with various other changes made thereto within the scope of the gist of the disclosure. It should be understood that the scope of rights to the present disclosure is not limited to the above embodiments.

What is claimed is:

1. An expander comprising:
   an expanding chamber that expands a working fluid introduced and discharges the expanded working fluid;
   a driving chamber housing a driving mechanism that is driven by expansion energy of the working fluid;
   an intermediate chamber interposed between the expanding chamber and the driving chamber;
   a first seal member that seals a gap between the expanding chamber and the intermediate chamber;
   a second seal member that seals a gap between the driving chamber and the intermediate chamber; and
   a pressurizing unit that pressurizes a pressurized fluid filling the intermediate chamber.

2. The expander according to claim 1, wherein the pressurizing unit has:
   a pressurizing device that pressurizes the pressurized fluid;
   a first pressure sensor that detects a pressure of the pressurized fluid;
   a second pressure sensor that detects a pressure of the working fluid discharged from the expanding chamber; and
   a control unit that controls the pressurizing device based on detection results of the first pressure sensor and the second pressure sensor.

3. The expander according to claim 1, wherein the pressurizing unit pressurizes the pressurized fluid using a pressure of the working fluid discharged from the expanding chamber.

4. The expander according to claim 3, wherein the pressurizing unit includes a tank having:
   a first chamber which communicates with the expanding chamber and into which the working fluid discharged from the expanding chamber is introduced;
   a second chamber which communicates with the intermediate chamber and is filled with the pressurized fluid; and
   a pressure transmitting part that separates the first chamber and the second chamber from each other and transmits an internal pressure of the first chamber to the second chamber.

5. The expander according to claim 4, wherein the tank has a filling port through which the second chamber is filled with the pressurized fluid.

6. The expander according to claim 1, comprising:
   a housing having the expanding chamber, the driving chamber, and the intermediate chamber formed inside; and
   a scroll mechanism which is provided inside the expanding chamber and in which the working fluid expands between a fixed scroll and a movable scroll and the movable scroll performs revolving turning movements relatively to the fixed scroll, wherein:
   the intermediate chamber is formed by an annular groove that is formed in the housing so as to face the movable scroll; and
   the first seal member and the second seal member are provided one on each side of the annular groove in a radial direction between the housing and the movable scroll.

7. The expander according to claim 1, wherein the working fluid and the pressurized fluid are fluids of different types.

8. The expander according to claim 7, wherein the working fluid is hydrogen and the pressurized fluid is nitrogen, helium, water, or a coolant.

9. A fuel cell system comprising:
   a hydrogen tank holding hydrogen that is the working fluid;
   a fuel cell that generates electricity through an electrochemical reaction between the hydrogen and oxygen in air;
   a hydrogen supply passage through which the hydrogen is supplied from the hydrogen tank to the fuel cell; and
   the expander according to claim 1 which is connected to some point in the hydrogen supply passage and in which the hydrogen supplied from the hydrogen tank to the fuel cell is introduced into and expanded in the expanding chamber and then discharged from the expanding chamber.

10. The fuel cell system according to claim 9, comprising:
    a radiator that cools a cooling medium of the fuel cell; and
    a fan that is driven by driving force of the driving mechanism and blows air toward the radiator.

11. A fuel cell system comprising:
    a hydrogen tank holding hydrogen that is the working fluid;
    a fuel cell that generates electricity through an electrochemical reaction between the hydrogen and oxygen in air;
    a hydrogen supply passage through which the hydrogen is supplied from the hydrogen tank to the fuel cell; and
    the expander according to claim 4 which is connected to some point in the hydrogen supply passage and in which the hydrogen supplied from the hydrogen tank to the fuel cell is introduced into and expanded in the expanding chamber and then discharged from the expanding chamber.

12. The fuel cell system according to claim 11, wherein the tank is connected to the hydrogen supply passage, between the expander and the fuel cell, such that the hydrogen discharged from the expander passes through the first chamber.

* * * * *